United States Patent
Ji et al.

(10) Patent No.: US 8,354,199 B2
(45) Date of Patent: Jan. 15, 2013

(54) MULTI-LAYER DIFFUSION MEDIUM SUBSTRATE

(75) Inventors: Chunxin Ji, Rochester, NY (US); Mark Mathias, Pittsford, NY (US); Jeanette E. O'Hara, Honeoye, NY (US); Yeh-Hung Lai, Webster, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 2261 days.

(21) Appl. No.: 11/180,423

(22) Filed: Jul. 13, 2005

(65) Prior Publication Data
US 2007/0015042 A1    Jan. 18, 2007

(51) Int. Cl.
- *H01M 8/10* (2006.01)
- *H01M 8/24* (2006.01)
- *H01M 8/04* (2006.01)
- *H01M 4/64* (2006.01)

(52) U.S. Cl. ........ 429/480; 429/457; 429/481; 429/514; 429/518

(58) Field of Classification Search .................. None
See application file for complete search history.

(56) References Cited

U.S. PATENT DOCUMENTS

| | | | |
|---|---|---|---|
| 4,396,669 A | | 8/1983 | Cariou |
| 5,672,439 A | * | 9/1997 | Wilkinson et al. ............. 429/40 |
| 6,350,539 B1 | * | 2/2002 | Wood et al. .................... 429/34 |
| 6,605,381 B1 | * | 8/2003 | Rosenmayer ................. 429/39 |

FOREIGN PATENT DOCUMENTS

| | | |
|---|---|---|
| DE | 3132596 | 6/1982 |
| DE | 3132596 A1 | 6/1982 |

OTHER PUBLICATIONS

Stallings Industries, Inc., web page disclosing Garlock GYLON Style 3545, pp. 1-3.
PatentDE, EP Patent 1252006, May 27, 2004.

* cited by examiner

*Primary Examiner* — Barbara Gilliam
*Assistant Examiner* — Adam A Arciero
(74) *Attorney, Agent, or Firm* — BrooksGroup

(57) ABSTRACT

A multi-layer diffusion medium substrate having improved mechanical properties is disclosed. The diffusion medium substrate includes at least one stiff layer and at least one compressible layer. The at least one stiff layer has a greater stiffness in the x-y direction as compared to the at least one compressible layer. The at least one compressible layer has a greater compressibility in the z direction. A method of fabricating a multi-layer diffusion medium substrate is also disclosed.

26 Claims, 2 Drawing Sheets

MULTI-LAYER DIFFUSION MEDIUM SUBSTRATE

FIELD OF THE INVENTION

The present invention relates to fuel cells and devices that generate electricity to power vehicles or other machinery. More particularly, the present invention relates to applying a multi-layered gas diffusion medium substrate between a membrane electrode assembly (MEA) and a flow field having a relatively soft and elastic compressible layer which is positioned in proximity to the MEA and a stiff layer which is positioned in proximity to the flowfield. This construction achieves optimum mechanical integrity of the gas diffusion medium and results in optimum performance of the fuel cell.

BACKGROUND OF THE INVENTION

Fuel cell technology is a relatively recent development in the automotive industry. It has been found that fuel cell power plants are capable of achieving efficiencies as high as 55%. Furthermore, fuel cell power plants emit only heat and water as by-products.

A fuel cell includes three components at its core: a cathode catalyst layer, an anode catalyst layer, and an electrolyte that is sandwiched between the cathode and the anode layers and conducts protons. This three-layer sandwich as used in a proton-exchange membrane (PEM) fuel cell will be referred to herein as a membrane electrode assembly (MEA), and it is sometimes referred to as a catalyst-coated membrane (CCM). In operation, the catalyst in the anode layer splits hydrogen into electrons and protons. In a single fuel cell arrangement, the electrons are distributed as electric current from the anode, through an external circuit where they can provide electrical energy, and then to the cathode. The protons migrate from the anode through the electrolyte to the cathode. The catalyst in the cathode layer facilitates splitting of oxygen molecules and the subsequent reaction with the protons (passing through the membrane) and the electrons (returning from providing electrical energy) to form water. Individual fuel cells can be stacked together in series to generate increasingly larger voltages and quantities of electricity.

In a PEM fuel cell, a polymer membrane serves as the electrolyte between a cathode and an anode. The polymer membrane currently being used in fuel cell applications requires a certain level of humidity to facilitate proton conductivity of the membrane. Therefore, maintaining the proper level of humidity in the membrane, through humidity/water management, is very important for the proper functioning of the fuel cell. The polymer electrolyte membrane swells when absorbing water and shrinks when drying out thus demanding that the fuel cell stack be engineered to manage the effect of the changing membrane volume on stack size and internal compression.

Disposed outside of the MEA is a pair of gas diffusion media (to be described below) and conductive separator plates (also known as bipolar plates) for mechanically securing the MEA and electrically connecting adjacent MEAs in series in a fuel cell stack. Both sides of the separator plate, one of which is disposed toward the MEA and gas diffusion media of one cell and the other of which is disposed toward the MEA and gas diffusion media of the next cell in the stack, are provided with gas passages, also known as flowfields, for supplying reactant gases, hydrogen to the anode side of the adjacent MEA and air/oxygen to the cathode side of the adjacent MEA. The flowfields also provide a means by which product water can be removed from the cell, carried away by unreacted gases. The bipolar plate also normally contains coolant channels within it and is constructed so that the coolant is isolated from the gases fed to and removed from both the anode and the cathode.

In the fuel cell, a gas diffusion medium which is typically made from carbon fiber paper or carbon fiber cloth is interposed between the flowfield of the bipolar plate and the MEA to facilitate optimum diffusion of the reaction gases to the electrodes, provide optimum conduction of electrons, transfer heat generated at the MEA to the coolant within the bipolar plate coolant channels, and facilitate transport of product water from the cathode to the flowfield. The diffusion medium also acts as a mechanical buffer layer between the soft MEA and the stiff bipolar plates by accommodating thickness variations in both the bipolar plates and the diffusion media as well as protecting the MEA from being damaged by the bipolar plate upon compression. Diffusion media are typically sheet-like in geometry, about 100-400 microns thick and cover the entire active area of the cell (usually 50-1000 $cm^2$). In the discussion below we refer to the "thickness direction" of the diffusion media (100-400 microns thick, normally 150-300 microns thick) as the z-direction. This differentiates it from the two "in-plane directions" of the sheet, referred to below as the x-y directions.

On the one hand, it is desirable for diffusion media to be stiff in the x-y directions such that upon compression, the diffusion media will not intrude into the flowfield channels of the bipolar plate. Such intrusion increases the pressure drop from the gas inlet of the respective flowfield to the outlet of the flowfield, which will increase the compressor capacity and electrical consumption requirements. In addition, it may cause a large pressure difference between anode and cathode compartments, thus damaging the MEA. In addition, stiffness of the diffusion medium in the x-y direction is desired in order to increase the contact pressure between the MEA and the diffusion medium over the flowfield channel region, thus reducing the electrical and thermal contact resistance between MEA and diffusion media. The stiffness of the diffusion media is defined as the force required to produce a defined deformation in the x or y direction [Timoshenko S. P. and Gere J. M., 1972, *Mechanics of Materials*, Litton Education Publishing, Inc.] It depends on the modulus of elasticity (an intrinsic material property) and the material thickness.

On the other hand, a compressible and elastic property in the z-direction of the diffusion medium is also advantageous. This reduces local high stress spots during compression of the stack. In addition, it maintains the contact between the MEA and the diffusion medium during the membrane swelling and shrinking cycles. Furthermore, a diffusion media with high compressibility in the z direction has the ability to compensate for thickness variations in the diffusion media and bipolar plates. Compressibility is defined as the compressive strain at a defined compressive load applied in the z direction, where compressive strain is defined as the ratio of compressive deformation to the original thickness. A diffusion media typically needs to exhibit compressive strains in the range of 10 to 50% when under stack compressive loads ranging from 50 to 400 psi. Thus, it is clear that the mechanical properties of the diffusion media must be optimized to meet the various requirements in the fuel cell stack. All of the desirable properties are difficult to achieve simultaneously. For example, achieving extremely anisotropic mechanical properties, stiffness (in the x-y directions) and sufficiently high compressibility (in the z direction), in the same material is a materials engineering challenge.

Tests commonly used to determine the mechanical properties of a gas diffusion medium material include bending tests and compressive stress-strain tests. In a bending test of a sheet-like material (e.g. ASTM D790 and ASTM D5934), the modulus of elasticity and modulus of rupture of the material in the x-y directions are measured. A high magnitude of the bending stiffness, as a result of high modulus of elasticity and/or thickness, increases compression of the diffusion media between the MEA and the bipolar plate over the plate flowfield channels, thus minimizing contact resistance there. Minimizing contact resistance over the channels is important to minimize voltage losses and achieve maximum fuel cell efficiency. In the compressive stress-strain test (e.g. ASTM E111), the material is compressed in the z-direction and strain is monitored as a function of stress.

In the manufacturing of gas diffusion medium materials for fuel cells, difficulty is encountered in fabricating a material that exhibits relatively high compressibility in the z-direction combined with stiffness in the x-y directions. For example, the wet-laid carbon fiber papers such as Toray TGPH-060 carbon fiber substrates are relatively stiff in the x-y directions due to the properties of carbon fibers and the impregnation of resin binder during the manufacture process. However, this type of wet-laid carbon fiber paper exhibits less compressibility than many commonly used diffusion media such as air-laid hydro-entangled carbon fiber paper (such as produced by Freudenberg, Germany) and woven carbon cloths (Zoltek, USA). Whereas these materials exhibit superior compressibility in the z-direction, they lack the desired stiffness in the x-y direction, resulting in higher contact resistance over the channel and higher channel intrusion.

Accordingly, a multi-layer diffusion medium substrate is needed which combines the properties of a compressible substrate with those of a stiff substrate to achieve the optimum diffusion medium material for use in a fuel cell.

SUMMARY OF THE INVENTION

The present invention is generally directed to a multi-layered diffusion medium substrate that is suitable for use as a gas diffusion medium in a fuel cell. The multi-layered diffusion medium substrate includes at least a stiff layer combined with a compressible layer. The stiff layer is more resistant to deformation along the x and y directions than is the comparably compressible layer. In an assembled fuel cell stack, the multi-layered diffusion medium substrates are arranged such that the more compressible layers are positioned in closer proximity than the stiff layers to the membrane electrode assemblies (MEAs) of each cell, whereas the stiff layers are positioned in closer proximity than the compressible layers to the bipolar plates in each cell. Upon compression of the substrate between the MEA and the bipolar plate, the stiff layer imparts a high degree of contact pressure against the relatively compressible layer, thus preventing intrusion of the diffusion media into the flowfield channels of the plate. Furthermore, the stiff layer induces a high contact pressure between the MEA and the diffusion media in the channel region, desired to minimize electrical and thermal resistance at that interface. The relatively compressible property of the layer adjacent to MEA helps maintain the contact between MEA and diffusion media in spite of plate and diffusion media thickness variation.

The present invention is further directed to a method of fabricating a diffusion medium substrate. The method includes forming a first carbon fiber layer, stiffening the first carbon fiber layer by impregnating the first carbon fiber layer with resin binders and providing a second carbon fiber layer on top of the first carbon fiber layer.

BRIEF DESCRIPTION OF THE DRAWINGS

The invention will now be described, by way of example, with reference to the accompanying drawings, in which.

DETAILED DESCRIPTION OF THE INVENTION

Figure 1:
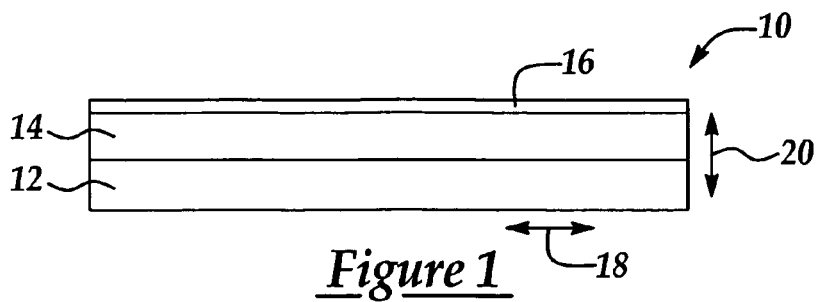
FIG. 1 is a cross-sectional view of a multi-layered diffusion medium substrate of the present invention.

Referring initially to FIG. 1, an illustrative embodiment of the multi-layered diffusion medium substrate according to the present invention is generally indicated by reference numeral 10. The substrate 10 includes a stiff layer 12 and a compressible layer 14 provided on the stiff layer 12. The multi-layer substrate may further be treated with a coating applied to the compressible layer 14 on the MEA side that improves water management, often consisting of carbon particles bound by a hydrophobic fluoropolymer. Such layers are well known to those skilled in the art and are often referred to as microporous layers (MPLs). Such a layer is shown in FIG. 1 as coating 16, adjacent to the relatively compressible layer 14. Furthermore, a catalyst layer can be applied to the microporous layer or applied directly to the substrate without the use of a microporous layer. Such a layer is not shown in FIG. 1 but is well known to those skilled in the art. Furthermore, the entire structure can be treated with hydrophobic polymer (such as polytetrafluroethylene, e.g. Teflon® from DuPont), again a well-known practice to those skilled in the art. The microporous layer and the hydrophobic polymer treatment have relatively little influence on the mechanical properties of the diffusion medium. When assembled into a fuel cell as will be hereinafter further described, the stiff layer 12 is disposed adjacent to the bipolar plate or flowfield, whereas the compressible layer 14 is disposed adjacent to the MEA of the fuel cell. The multi-layered substrate 10 combines the properties of the stiff layer 12 and the compressible layer 14 to optimize the performance characteristics of the multi-layered substrate 10 as a gas diffusion medium in the fuel cell, as will be hereinafter further described.

As compared to the compressible layer 14, the stiff layer 12 exhibits a greater modulus of elasticity, resulting in greater resistance to expansion or deformation along the x-y direction 18. The compressibility of layer 12 is preferably less than that of layer 14. Preferably, the stiff layer 12 has a modulus of elasticity at least three times that of the compressible layer 14. The thickness of the stiff layer 12 is at least 8% and no more than 70% of the total thickness of the gas diffusion medium. More preferably, the stiff layer 12 has a modulus of elasticity at least six times higher than the compressible layer 14. More preferably, the thickness of the stiff layer 12 is at least 15% and no more than 50% of the total thickness of the gas diffusion medium. Because they are very stiff in the x-y direction 18, wet-laid carbon fiber papers with resin impregnation known to those skilled in the art are suitable for use as the stiff layer 12. Examples of wet-laid resin-impregnated carbon fiber papers which are suitable for the stiff layer 12 is the Toray TGPH series carbon fiber paper substrates available from the Toray Corp. Japan. Layer thickness of less than 200 microns but greater than 20 microns is preferred.

As compared to the stiff layer 12, the relatively compressible layer 14 needs to exhibit a greater compressibility along the z-direction 20. Air-laid hydro-entangled carbon fiber papers which are known to those skilled in the art are particularly suitable for use as the compressible layer 14. Examples of air-laid hydro-entangled materials which are suitable for the compressible layer 14 include the Freudenberg FC H2315 series gas diffusion paper substrate available from Freudenberg & Co., Weinheim, Germany. Woven carbon cloths (e.g. Zoltek, USA) are also suitable but less preferred materials for use as the compressible layer 14. Layer thickness of greater than 70 microns but less than 400 microns is preferred.

Figure 2:
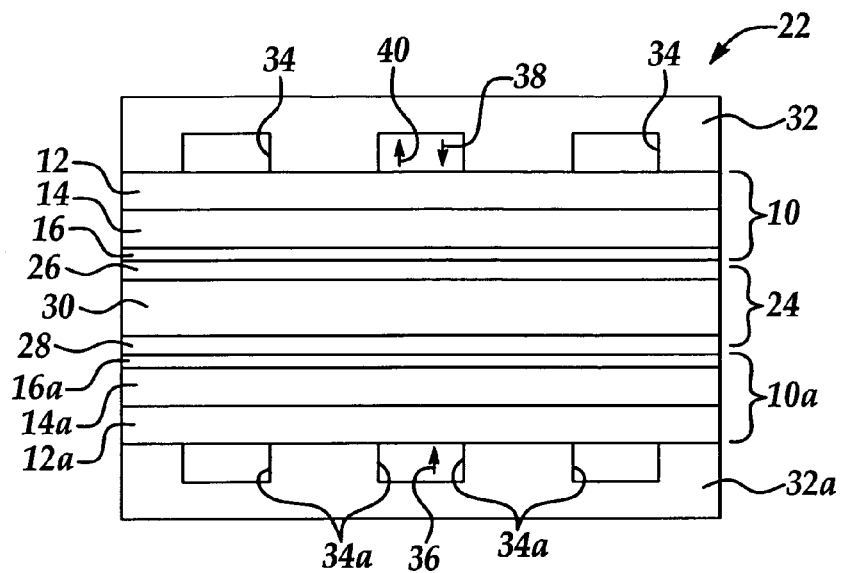
FIG. 2 is a fuel cell which includes a pair of the multi-layered diffusion medium substrates of the present invention.

Referring next to FIG. 2, a fuel cell 22 in implementation of the multi-layered diffusion medium substrate 10 of the present invention as a gas diffusion medium is shown. The fuel cell 22 includes a proton-exchange membrane (PEM) 30 which is sandwiched between a cathode (sometimes called a cathode catalyst layer) 26 and an anode (sometimes called an anode catalyst layer) 28. A bipolar plate 32 on the cathode side of the fuel cell 22 includes multiple flowfield channels 34, and a bipolar plate 32a on the anode side of the fuel cell 22 includes multiple flowfield channels 34a.

A multi-layered diffusion medium substrate 10 of the present invention is interposed between the cathode catalyst layer 26 and the corresponding bipolar plate 32. The optional microporous layer coating 16 on the surface of the compressible layer 14 contacts the cathode catalyst layer 26, whereas the stiff layer 12 of the substrate 10 is contacted by the bipolar plate 32. A second multi-layered diffusion medium substrate 10a of the present invention is interposed between the anode catalyst layer 28 and the corresponding bipolar plate 32a. A microporous layer coating 16a can optionally be applied on the surface of the compressible layer 14a of the substrate 10a. The microporous layer 16a, when present, contacts the anode catalyst layer 28, whereas the stiff layer 12a of the substrate 10a is engaged by the bipolar plate 32a.

During operation of the fuel cell 22, hydrogen gas 36 flows through the flow channels 34a of the bipolar plate 32a and diffuses through the substrate 10a to the anode catalyst layer 28. In like manner, oxygen or air 38 flows through the flow channels 34 of the bipolar plate 32 and diffuses through the substrate 10 to the cathode catalyst layer 26. At the anode 28, the hydrogen 36 is split into electrons and protons. In a single fuel cell, the electrons are distributed as electric current from the anode 28, through an electric load (not shown) and then to the cathode catalyst layer 26. The protons migrate from the anode catalyst layer 28, through the membrane 30 to the cathode 26. At the cathode 26, the protons are combined with electrons returning from the electric load and oxygen 38 to form water 40. The product water must then travel from the cathode 26, through the substrate 10 into the flow channels 34 of the bipolar plate 32 from where it is then discharged from the fuel cell 22.

In the fuel cell 22, the substrate 10 is compressed between the catalyst layer and the bipolar plate 32. Accordingly, the x-y directional robustness of the stiff layer 12 causes the stiff layer 12 to impart a high degree of contact pressure between the cathode catalyst layer and the diffusion media substrate 10 over the flow channels 34 and also prevents diffusion media from intrusion into flow channel 34 of the bipolar plate 32. This prevents excessive pressure drop from occurring in the fuel cell 22 and optimizes functioning of the flowfield channels 34. The stiff layer 12 and the compressible layer 14 help to maintain the contact between the catalyst layer 26 and diffusion media 10 and reduces electrical and thermal resistance during swelling and shrinking of the membrane 30 throughout operation of the fuel cell 22. The same advantages apply with respect to the substrate 10a interposed between the anode catalyst layer 28 and the bipolar plate 32a.

Referring again to FIG. 1, the stiff layer 12 and compressible layer 14 of the substrate 10 may be fabricated separately and then bonded to each other in the multi-layered substrate 10 according to methods that are known to those skilled in the art. However, the present invention contemplates fabrication of the substrate 10 as a single substrate having multiple plies or layers, including the stiff layer 12 and the compressible layer 14, having different properties. In either case, the stiff layer 12 has more robust or deformation-resistant properties responsive along the x-y direction 18 as compared to the compressible layer 14. On the other hand, the layer 14 is preferably more compressible in the z-direction 20 as compared to the stiff layer 12, and it provides the primary means by which thickness variation in the plates and diffusion media, as well as compression load change during fuel cell operation, are accommodated.

A general description of the materials of construction of the multi-layer diffusion media is now provided. Both layers can be conducted from a variety of conductive porous materials such as foams, meshes, cloths, and non-woven mats. The compressible layer will generally be composed of cloths or non-woven mats made from carbon and/or metal fibers. The non-woven mats can contain a flexible binder such as carbonized acrylic pulp or a small amount of carbonized phenolic resin. The compressible layer could also be composed of flexible metal or carbon foams. The stiff layer will generally be composed of cloths or non-woven mats also made from carbon and/or metal fibers. Stiff layers based on woven cloths and non-woven mats will also have a relatively rigid binder such as a large amount of carbonized phenolic resin. The stiff layer could also be composed of relatively rigid metal or carbon foams.

Figure 3:
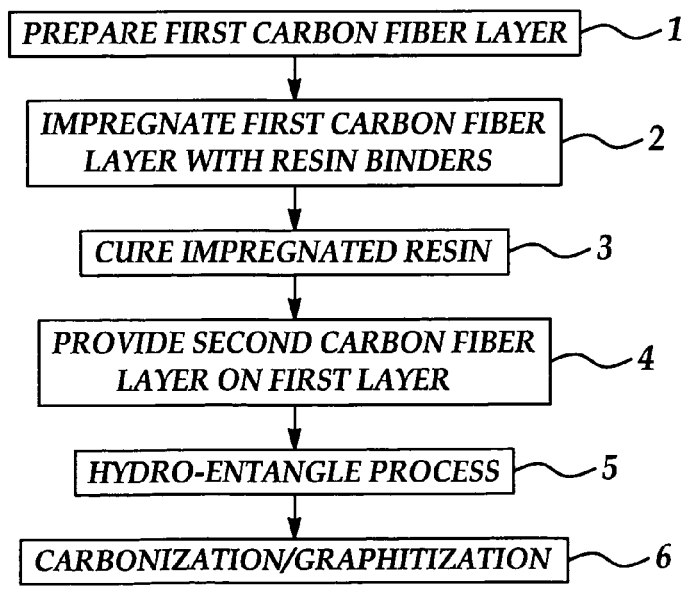
FIG. 3 is a flow diagram that illustrates sequential process steps carried out in fabrication of a multi-layered diffusion medium substrate according to the present invention.

An example of how to make a multi-layer diffusion media of the present invention is now described. The flow diagram of FIG. 3 illustrates sequential process steps carried out according to an illustrative method of fabricating a multi-layered diffusion medium substrate. In step 1, a first carbon fiber layer is prepared. The first carbon fiber layer is fabricated using a conventional, wet-laid paper-making process. In step 2, the first carbon fiber layer is impregnated with resin binders, typically in conventional wet-dip fashion. In step 3, the impregnated resin is cured at a temperature of typically about 100-300 degrees C. In step 4, a second carbon fiber layer is deposited on the first carbon fiber layer. The second carbon fiber layer is either air-laid or wet-laid on the first carbon fiber layer. In step 5, the multi-layered carbon fiber substrate is subjected to a hydro-entangle or water jet treatment process to bond or attach the first carbon fiber layer to the second carbon fiber layer. If water jet treatment is used, the jet characteristics would be chosen to bond the layers together without damaging the stiff layer. Finally, in step 6, the multi-layered carbon fiber substrate is carbonized and/or graphitized at a temperature of typically about at least 1300 degrees C., preferably 1700 degrees C., and optionally greater than 2000 degrees C. The multi-layer structure can optionally be treated with a hydrophobic polymer. Additionally, a microporous layer coating can optionally be provided on top of the second carbon fiber layer. Furthermore, it is not absolutely necessary to attach the stiff and compressible layers prior to compressing them in the fuel cell. The fuel cell compression can induce sufficient contact between the layers so they would function as desired. In the multi-layered carbon fiber substrate, the first carbon fiber layer exhibits a greater stiffness in the x-y direction as compared to the second carbon fiber layer, whereas the second carbon fiber layer preferably exhibits a greater z-directional compressibility as compared to the first carbon fiber layer. Accordingly, in the multi-layered diffusion membrane substrate 10 of FIG. 1, the first carbon fiber layer functions as the stiff layer 12 and the second carbon fiber layer functions as the compressible layer 14.

EXAMPLE 1

Figure 4:
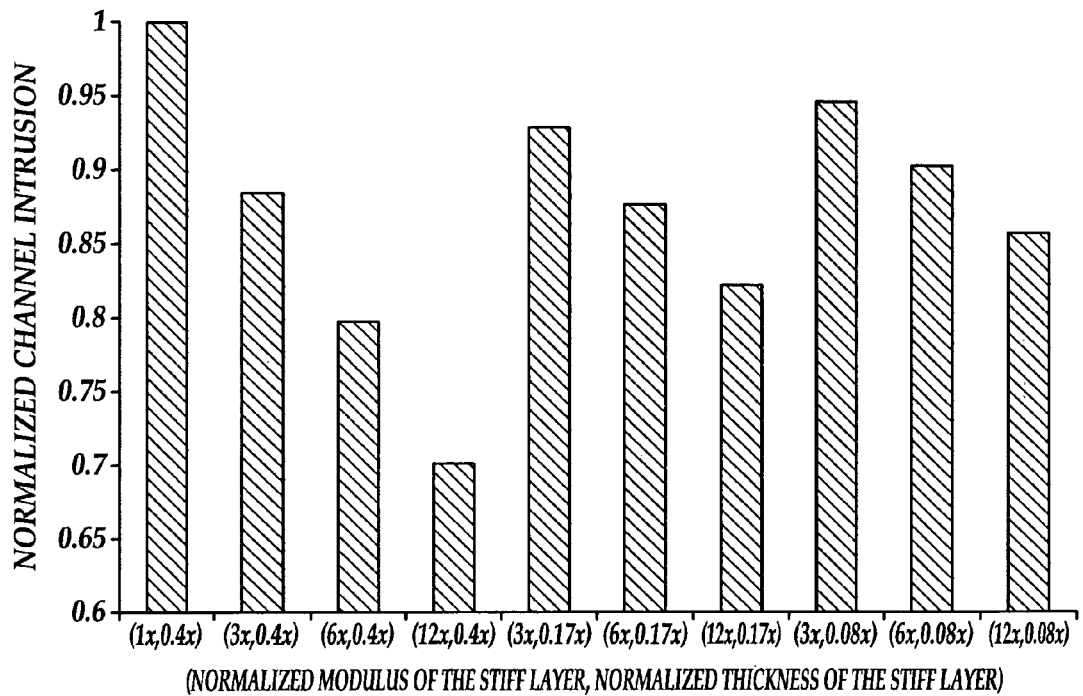
FIG. 4 shows an example of improved channel intrusion using the current invention.
Figure 5:
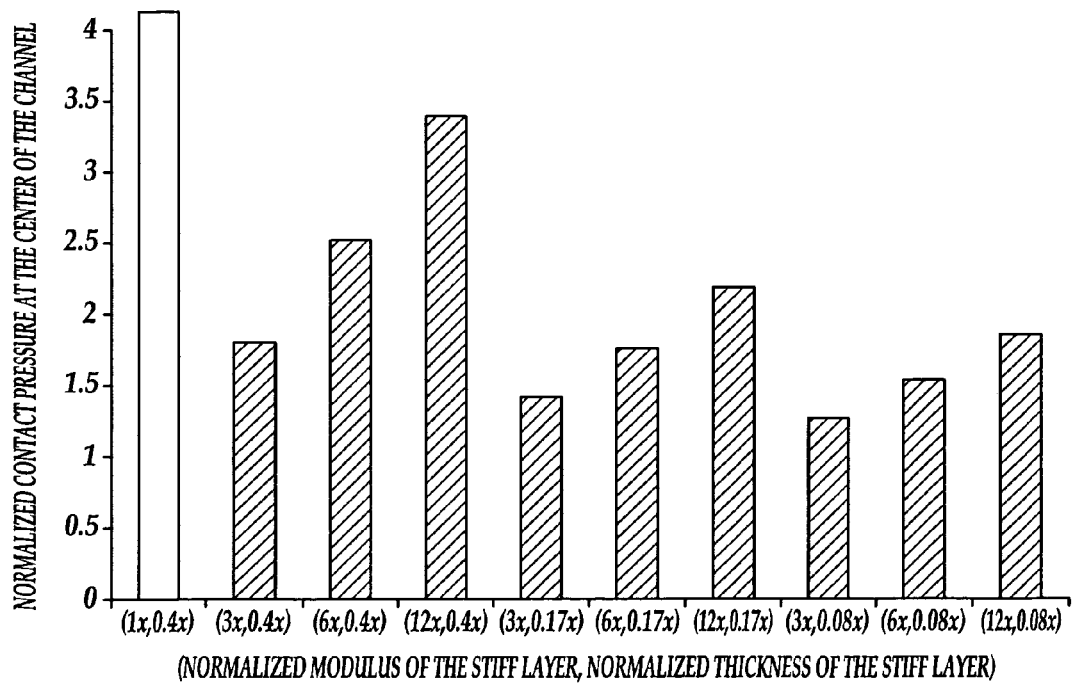
FIG. 5 shows an example of improved compression over the channel using the current invention.

In FIGS. 4 and 5, a comparison by finite element analysis based computer modeling was performed to evaluate the intrusion and contact pressure at the middle of the channel between the prior-art and the current invention. The prior art is represented by a typical commercial gas diffusion medium (e.g. Sigracet® GDL 21 Series Gas Diffusion Layer by SGL Carbon Group) which was estimated to have a modulus of elasticity of 1000 MPa. The thickness is 260 microns. The behavior of nine multi-layer gas diffusion media variations was modeled, each having the same total thickness as the prior art—260 microns. The compressible layer was assumed to consist of the same material as the prior art. The nine different stiff layers were made of the combination of three thicknesses: 108, 43, and 22 microns and three elastic moduli of three, six, and twelve times that of the compressible layer. For this illustrative calculation, the z-direction compressibility (i.e., the compressive stress-strain responses) was assumed to be the same as the prior art. These compressibility values were 0.15 strain at 100 psi, 0.21 strain at 200 psi, 0.27 at 300 psi, 0.33 at 400 psi, 0.35 at 450 psi, and 0.37 at 500 psi. Both prior art and the current invention were compressed between a rigid flat plane and a rigid flowfield of 1 mm-wide channel and 2 mm-wide land. The compression over the lands was 450 psi. The intrusion was determined by the distance in the z-direction between the point of maximum intrusion of the gas diffusion medium (at the center of the channel) and the land plane of the flow field. The contact pressure was determined by the reaction pressure at the surface facing the flat plate at the middle of the channel. In accordance with conventional finite element analysis techniques, the first step of the analysis was to generate a geometric representation of the flowfield and the diffusion media, including all the layers. A geometric model of the diffusion media was created by dividing all the material into discrete elements (also called mesh). The flowfield and flat plate were modeled as rigid surfaces since typical flowfields are made of material much stiffer than the diffusion media. FIGS. 4 and 5 illustrates the intrusion and contact pressure (both normalized with respect to the prior-art case), respectively, of the nine test cases as compared to the prior art case. It is clearly seen that for all cases using the current invention, intrusion has been improved by between 5% and 30% and the contact pressure has been improved by between 28% and 240%. The benefits of the current invention are clearly demonstrated in this example in which we see the impact of the use of a stiff layer on decreasing diffusion media intrusion into the channel and increasing contact pressure over the channel. In the preferred case in which the compressibility of the stiff layer were less than that of the prior art material, the benefit would be even greater.

EXAMPLE 2

In addition to the modeling and analysis, a dry pressure drop test was performed in order to exhibit the benefit of the invention with respect to decreasing pressure drop by decreasing diffusion media intrusion into the flowfield channel. In this experiment, the gas diffusion layer to be characterized was placed over the specified flow field, compressed to a given load, and gas was passed through the flowfield at a specified flowrate. This test was performed on a flowfield, and the measured pressure drop in the plate indicated intrusion of the gas diffusion layer into the flow field channel. In the prior art experiment performed, a gas diffusion layer, Freudenberg FC H2315, 209 microns thick, 0.32 strain at 450 psi, 800 MPa modulus of elasticity was used to compare to the invention. The invention was exemplified by placing first a piece of Toray TGPH 030, 105 microns thick, 0.28 strain at 450 psi, 3000 MPa modulus of elasticity) against the flow field, and subsequently placing the Freudenberg FC H2315 gas diffusion layer on top of it, and finally this was laid against a flat graphite plate and compressed. Although the layers were not attached in this example, this combination aims at targeting the prevention of channel intrusion by using the multi-layer gas diffusion layer. At a given flow rate, compression, and flowfield geometry, the pressure drop of the multi-layer example was 50% of that observed in the prior art gas diffusion media case.

While the preferred embodiments of the invention have been described above, it will be recognized and understood that various modifications can be made in the invention and the appended claims are intended to cover all such modifications which may fall within the spirit and scope of the invention.

The invention claimed is:

1. A multi-layer diffusion medium substrate for a fuel cell having a catalyst layer and a flowfield, comprising:
   at least one stiff layer for engaging the flowfield;
   at least one compressible layer provided on or adjacent to said at least one stiff layer for engaging the catalyst layer;
   wherein said at least one stiff layer has a modulus of elasticity higher than said at least one compressible layer; and
   wherein said at least one stiff layer has a thickness of no greater than 70% of a total thickness of said diffusion medium substrate, and
   wherein said at least one stiff layer being sufficiently stiff to prevent intrusion of the diffusion medium substrate into the gas flowfield of a fuel cell bipolar plate thereby preventing excess pressure drop from occurring in a fuel cell due to flowfield obstruction by the diffusion medium substrate.

2. The diffusion medium substrate of claim 1 further comprising a microporous layer on said at least one compressible layer.

3. The diffusion medium substrate of claim 1 wherein said at least one stiff layer comprises a carbon fiber paper layer.

4. The diffusion medium substrate of claim 3 wherein said carbon fiber paper layer is a wet-laid type carbon fiber layer.

5. The diffusion medium substrate of claim 1 wherein said at least one compressible layer comprises a carbon fiber layer.

6. The diffusion medium substrate of claim 5 wherein said carbon fiber layer is a dry-laid type carbon fiber layer.

7. The diffusion medium substrate of claim 1 wherein said at least one stiff layer has a modulus of elasticity at least three times of said at least one compressible layer.

8. The diffusion medium substrate of claim 1 wherein said at least one stiff layer has a thickness of at least 15%, and no more than 50% of said total thickness of said diffusion medium substrate.

9. The diffusion medium substrate of claim 1 wherein said stiff layer has a thickness of less than 200 microns and greater than 20 microns.

10. The diffusion medium substrate of claim 1 wherein said at least one compressible layer is more compressible than said at least one stiff layer.

11. The diffusion medium substrate of claim 1 wherein said at least one compressible layer has a thickness of greater than 70 microns and less than 400 microns.

12. A multi-layer diffusion medium substrate for a fuel cell having a catalyst layer and a flowfield comprising:
at least one stiff layer for engaging the flowfield;
at least one compressible layer provided on said at least one stiff layer for engaging the catalyst layer;
wherein said at least one stiff layer and said at least one compressible layer define an x-y direction disposed generally along a plane of said at least one stiff layer and said at least one compressible layer and a z-direction generally perpendicular to said x-y direction;
wherein said at least one compressible layer has a greater compressibility along said z-direction as compared to said at least one stiff layer and said at least one stiff layer has a greater modulus of elasticity than said at least one compressible layer; and
wherein said at least one stiff layer has a thickness no more than 70% of a total thickness of said diffusion medium substrate, and
wherein said at least one stiff layer being sufficiently stiff to prevent intrusion of the diffusion medium substrate into the gas flowfield of a fuel cell bipolar plate thereby preventing excess pressure drop from occurring in a fuel cell due to flowfield obstruction by the diffusion medium substrate.

13. The diffusion medium substrate of claim 12 further comprising a microporous layer on said at least one compressible layer.

14. The diffusion medium substrate of claim 12 wherein said at least one stiff layer comprises a wet-laid type carbon fiber layer.

15. The diffusion medium substrate of claim 12 wherein said at least one compressible layer comprises a dry-laid type carbon fiber layer.

16. The diffusion medium substrate of claim 12 wherein said at least one compressible layer has a modulus of elasticity of less than 3000 MPa.

17. A fuel cell having a catalyst layer and a bipolar plate having a gas flowfield, comprising:
a multi-layer diffusion medium substrate comprising at least one stiff layer for engaging the flowfield;
at least one compressible layer provided on said at least one stiff layer for engaging the catalyst layer;
wherein said at least one stiff layer has a modulus of elasticity at least three times a modulus of elasticity of said at least one compressible layer; and
wherein said at least one stiff layer has a thickness no more than 70% of a total thickness of said diffusion medium substrate, and
wherein said at least one stiff layer being sufficiently stiff to prevent intrusion of the diffusion medium substrate into the gas flowfield of a fuel cell bipolar plate thereby preventing excess pressure drop from occurring in the fuel cell due to flowfield obstruction by the diffusion medium substrate, and said at least one stiff layer not intruding into the flowfield.

18. The diffusion medium substrate of claim 17 further comprising a microporous layer on said at least one compressible layer.

19. The diffusion medium substrate of claim 17 wherein said at least one stiff layer comprises a carbon fiber paper layer.

20. The diffusion medium substrate of claim 19 wherein said carbon fiber paper layer is a wet-laid type carbon fiber layer.

21. The diffusion medium substrate of claim 19 wherein said at least one compressible layer comprises a carbon fiber layer.

22. The diffusion medium substrate of claim 21 wherein said carbon fiber layer is a dry-laid type carbon fiber layer.

23. The diffusion medium substrate as set forth in claim 1 wherein said at least one stiff layer comprises a metal mesh.

24. A diffusion medium substrate as set forth in claim 1 wherein said at least one stiff layer comprises a rigid carbon foam.

25. A diffusion medium substrate as set forth in claim 12 wherein said at least one stiff layer comprises one of a rigid metal mesh or carbon foam.

26. A fuel cell as set forth in claim 18 wherein said at least one stiff layer comprises a rigid metal mesh or carbon foam.

* * * * *